(12) United States Patent
Mercer et al.

(10) Patent No.: US 7,496,748 B2
(45) Date of Patent: Feb. 24, 2009

(54) METHOD FOR ESTABLISHING A SECURITY ASSOCIATION BETWEEN TWO OR MORE COMPUTERS COMMUNICATING VIA AN INTERCONNECTED COMPUTER NETWORK

(75) Inventors: Chad W. Mercer, Chandler, AZ (US); Lee P. Noehring, Peoria, AZ (US)

(73) Assignee: ITT Manufacturing Enterprises, Wilmington, DE (US)

( * ) Notice: Subject to any disclaimer, the term of this patent is extended or adjusted under 35 U.S.C. 154(b) by 1677 days.

(21) Appl. No.: 09/911,149

(22) Filed: Jul. 23, 2001

(65) Prior Publication Data

US 2003/0018908 A1    Jan. 23, 2003

(51) Int. Cl.
*H04L 9/00* (2006.01)
(52) U.S. Cl. .................................... 713/150
(58) Field of Classification Search .......... 713/200–201
See application file for complete search history.

(56) References Cited

U.S. PATENT DOCUMENTS

| | | | |
|---|---|---|---|
| 5,983,350 A | | 11/1999 | Minear et al. |
| 6,055,236 A | * | 4/2000 | Nessett et al. ............... 370/389 |
| 6,141,705 A | | 10/2000 | Anand et al. |
| 6,845,449 B1 | * | 1/2005 | Carman et al. .............. 713/170 |
| 2002/0184487 A1 | * | 12/2002 | Badamo et al. ............. 713/153 |

OTHER PUBLICATIONS

"RFC791", Sep. 1981, Information Sciences Institute University of Southern California, pp. 7-9, Obtained from http://rfc.net/rfc791.html.*
RFC 2401, Security Architecture for the Internet Protocol, S. Kent, BBN Corp., R. Atkinson, @ Home Network, Nov. 1998.

* cited by examiner

*Primary Examiner*—Emmanuel L Moise
*Assistant Examiner*—Jeffrey D Popham
(74) *Attorney, Agent, or Firm*—Davidson Berquist Jackson & Gowdey, LLP

(57) ABSTRACT

A method for establishing a secure communication channel for information flow between two or more computers communicating via an interconnected computer network, and a system for implementing the method, in response to receiving a security association data structure from one of the computers. The received security association data structure is stored in a memory region having a specific memory address value, and the specific memory address value is assigned as the security parameter index value associated with the received inbound security association data structure. Additionally, a method of processing information received over a previously established secure communication channel, and a system for implementing the method, in response to receiving a data packet that includes an encrypted data portion, and a header portion that includes a security parameter index value. A memory region is located using the security parameter index value as an address pointer. The encrypted data portion of the received data packet is then processed based on a security association data structure stored in the located memory region.

6 Claims, 6 Drawing Sheets

METHOD FOR ESTABLISHING A SECURITY ASSOCIATION BETWEEN TWO OR MORE COMPUTERS COMMUNICATING VIA AN INTERCONNECTED COMPUTER NETWORK

BACKGROUND OF THE INVENTION

1. Field of the Invention

The present invention relates to a method for establishing secure communications via an interconnected computer network and, more particularly, to a method for establishing a security association between computers that are communicating, or desire to communicate, via the interconnected computer network.

2. Description of Related Art

Data that is transferred over an interconnected computer network, such as the Internet, is susceptible to various forms of attack. These attacks may result in such things as loss of privacy, loss of data integrity, identity theft, denial of service, or any combination of these attacks. The ever-expanding popularity of the Internet for secure communications, e-commerce, and various other transactions, has led to the need to ensure communications over non-secure interconnected computer networks like the Internet are secure from such attacks.

In order to address the above-mentioned concerns, the so-called "Internet Engineering Task Force" (IETF) developed a framework of open standards for ensuring the confidentiality, integrity, and authenticity of private communications over the Internet. This standards framework is known in the art as the Internet Security Protocol, or "IPSec." IPSec provides security services at the IP layer of a system, and allows a system to select required security protocols, determine the algorithm(s) used to secure data, and implement any cryptographic keys required to provide the security services. Because these security services are implemented within the IP layer, the IPSec services may be used by any higher layer protocol, such as TCP (Transmission Control Protocol), UDP (User Datagram Protocol), ICMP (Internet Control Message Protocol), BGP (Border Gateway Protocol), or various other protocols known in the art. IPSec can be used to establish one or more secure communication channels between host computers, between security gateways, such as a router or firewall, or between hosts and security gateways.

As is known, IP data traverses an interconnected computer network as discrete data packets, colloquially referred to as IP datagrams. IPSec provides a new set of IPSec headers that are added to IP datagrams. The new IPSec headers, among other things, provide information regarding the security protocols that are used to secure the IP datagram payload as it traverses an interconnected computer network. These security protocols are known as the Authentication Header (AH) and Encapsulating Security Payload (ESP). The AH security protocol provides connectionless integrity, data origin authentication, and an optional anti-replay service, and is generally represented using protocol number 51. The ESP security protocol provides confidentiality, integrity, data origin authentication, and anti-replay services, and is generally represented using protocol number 50. The AH and ESP protocols can be used independently or in combination with each other to provide a desired set of security services.

Fundamental to the use and understanding of IPSec is the Security Association (SA). In general, an SA is a relationship between two or more devices that describe how the devices will use IPSec's security services to securely communicate with each other. An SA is unidirectional. Hence, to secure bi-directional communication channels between two nodes in an interconnected computer network, two SAs are required, one for each direction. These individual secure communication channels are generally referred to as an "inbound tunnel" and an "outbound tunnel," where one device's inbound tunnel is the other device's outbound tunnel, and vice-versa.

An SA is uniquely identified by a "triple" that consists of predetermined data fields. Specifically, the triple consists of an IP Destination Address, an IPSec security protocol, and a Security Parameter Index (SPI). The IP Destination Address data field, as it connotes, specifies the IP address of the intended recipient. The IPSec security protocol data field specifies the security protocol that the devices have agreed upon implementing (e.g., AH=51, or ESP=50). The SPI is a randomly generated 32-bit value that distinguishes among different Security Associations established at the same destination address and using the same IPSec security protocol.

Each device that is intercommunicating over the non-secure network specifies the SPI value that the other devices should use when communicating to it over its inbound tunnel. For example, when two devices are establishing an SA, the first device will request an SPI value from the second device. The second device will then provide the first device with an SPI value. Thereafter, the first device will include the SPI value in the IPSec header when transmitting secure data over the first device's outbound tunnel, which is also the second device's inbound tunnel. As is known, an SA can be established either manually or automatically; however, in most instances an SA is established automatically using the Internet Key Exchange (IKE) processing software.

All active SAs of a device are stored within a centralized database, known as a Security Association Database (SAD). Thus, each active SA, both inbound and outbound, has an entry in the SAD. When one device sends an IP packet that requires IPSec protection, the device receiving the protected IP datagram will look to various portions of the datagram and determine the destination address, security protocol, and SPI value. These three values are used to create a hash key, the result of which is used to hash into the SAD. Thereafter, a linear search is conducted in the SAD until a match is found.

IPSec data transmission and processing is targeting higher and higher data rates. For example, data rates on the order of OC-24, OC-48, OC-192, and even higher, are being implemented and/or targeted. The present known methods of establishing and determining SAs for inbound IPSec traffic, especially at these higher data rates, becomes less and less efficient, due to the calculational overhead. Hence, there is a need in the art for a method of efficiently establishing and determining inbound SAs, that does not require the calculational overhead, and thus processing time, associated with present methods.

SUMMARY OF THE INVENTION

The present invention provides a method and system for establishing a secure communication channel for information flow between two or more computers communicating via an interconnected computer network by assigning the memory address location of an inbound SA as the SPI value of the inbound SA.

In one aspect of the present invention, a method of establishing a secure communication channel for information flow between two or more computers communicating via an interconnected computer network includes the step of receiving a security association data structure from one or more computers via the interconnected computer network. The received security association data structure is stored in a memory region having a specific memory address associated therewith. The specific memory address is assigned to a security parameter index value associated with the received security association data structure.

In another aspect of the present invention, a method of processing information received over a previously established secure communication channel includes the step of receiving a data packet that includes at least an encrypted and/or authenticated data portion and one or more header portions that include at least a security parameter index value. A memory region is located using the security parameter index value as an address pointer. And the encrypted and/or authenticated data portion of the received data packet is processed based on a security association data structure stored in the located memory region.

DETAILED DESCRIPTION OF THE PREFERRED EMBODIMENTS

Figure 1:
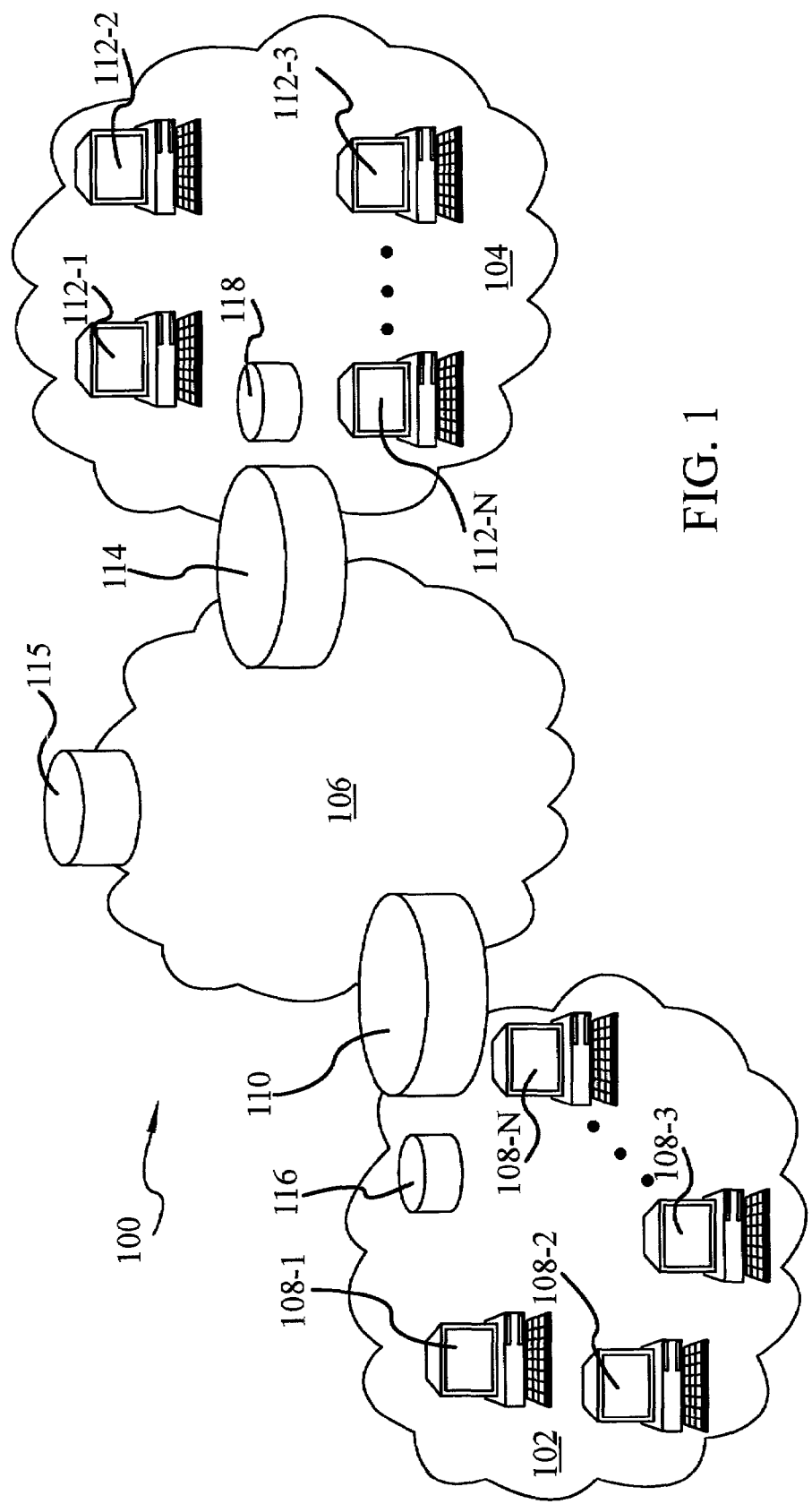
FIG. 1 is a functional block diagram depicting various computers communicating over an interconnected computer network.

A functional block diagram depicting various computer devices communicating over an interconnected computer network is depicted in FIG. 1. The system 100 depicts a first local network 102 coupled to a second local network 104 via an external non-secure computer network 106, such as the Internet. The first local network 102 includes a plurality of first individual computer workstations 108-1, 108-2, 108-3, . . . 108-N coupled to a first gateway computer 110, and the second local network 104 includes a plurality of second individual computer workstations 112-1, 112-2, 112-3, . . . 112-N coupled to a second gateway computer 114. It will be appreciated that the system 100 depicted in FIG. 1 is only exemplary of one embodiment, and that other embodiments are encompassed by the present invention. For example, the system may include individual computer workstations coupled directly to the Internet 106, or to the Internet 106 via a service provider.

Figure 2:
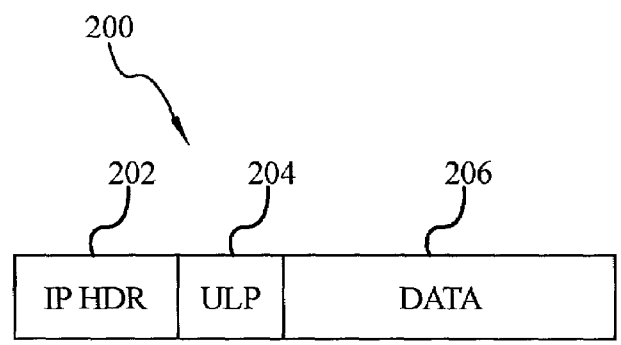
FIG. 2 depicts the general structure of an IP datagram.
Figure 3:
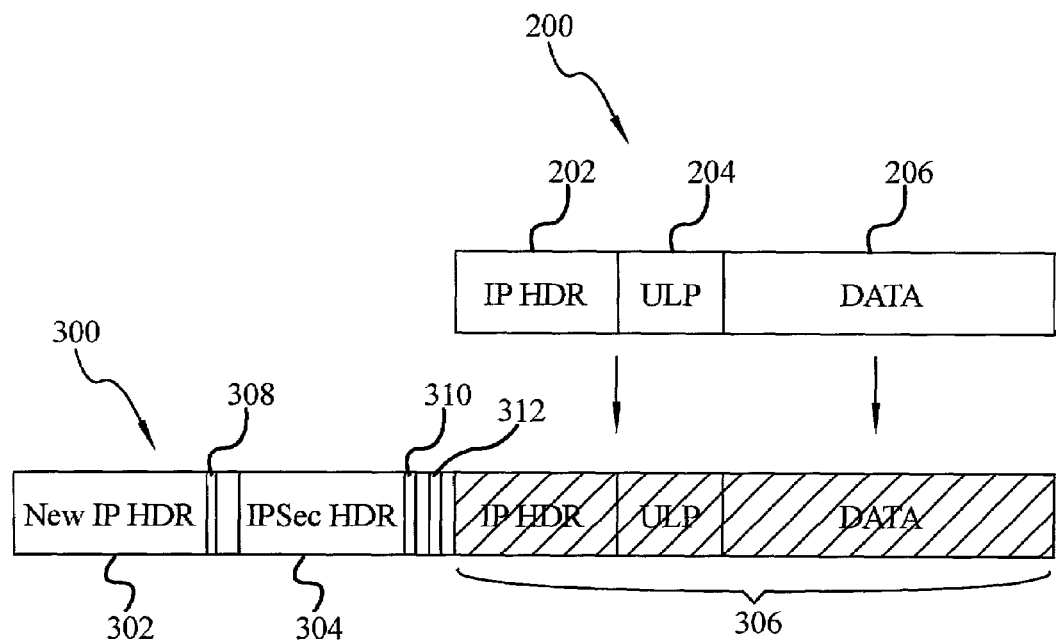
FIG. 3 depicts the general structure of an inbound IPSec datagram for tunnel mode operation.
Figure 4:
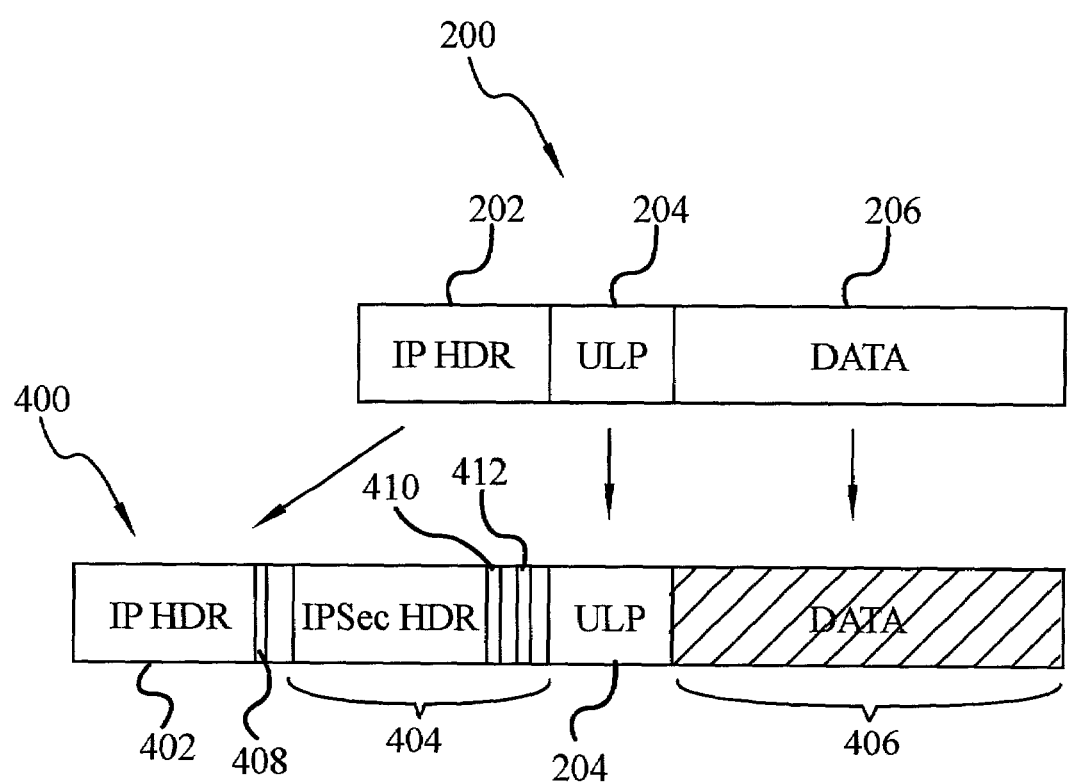
FIG. 4 depicts the general structure of an inbound IPSec datagram for transport mode operation.

As was noted above, data inverses the Internet 106 as IP datagrams. An IP datagram 200, as depicted in FIG. 2, typically includes an IP header portion 202, an upper layer protocol (ULP) header 204, and a data payload 206. Examples of an inbound IPSec datagram, i.e., an IP datagram subject to IPSec processing and received at its intended destination, are depicted in FIGS. 3 and 4 for tunnel mode and transport mode, respectively. As depicted therein, an IPSec datagram 300, 400 includes an IP header portion 302, 402, an IPSec header portion 304, 404, and an encrypted and/or authenticated payload portion 306, 406. The IP header portion 302, 402 may be either a new IP header portion 302, if operating in IPSec tunnel mode (FIG. 3), or the original IP header 402 of the unencrypted IP datagram 200, if operating in transport mode (FIG. 4). The encrypted and/or authenticated payload portion 306, 406 (represented by the diagonal lines) includes encrypted and/or authenticated forms of the data payload portion 206 from the unencrypted IP datagram 200. And, if operating in tunnel mode, the encrypted and/or authenticated payload portion 306 will also include an encrypted form of the original IP header portion 202 and upper layer protocol portion 204. Alternatively, in the transport mode, the original upper layer protocol portion 204 is included in its original form. The tunnel and transport operational modes are known in the art, and are explained in detail in RFC 2401, "System Architecture for the Internet Protocol," the entirety of which is hereby incorporated by reference. The IPSec header portion 304, 404 includes, among other things, the security protocol (e.g., AH, ESP, or both) 310, 410, and the Security Parameter Index (SPI) value 312, 412. The remaining portion of the SA triple, the destination address value 308, 408 is included in the IP header portion 302, 402.

As a precursor to a more detailed discussion of the present invention, a general discussion of secure communications between two computers using IPSec will first be provided. In this regard, when the operator of one of the first individual computer workstations, for example 108-1, wants to communicate with the operator of one of the second individual computer workstations, for example 112-1, the operator of the first individual computer workstation 108-1 sends data toward the operator of the second individual computer workstation 112-1. As was just discussed above, the data is sent in the form of IPSec datagrams. The first gateway computer 110 receives the first IPSec datagram and determines whether an IPSec SA exists with the second gateway computer 114. If not, then the first gateway computer 110 requests an IPSec SA from the second gateway computer 114, preferably via the Internet Key Exchange (IKE) software. The IKE software, as will be described in more detail below, resides in a software stack within each of the first 110 and second 114 gateway computers. The IKE software used may be any one of various conventional IKE software packages known in the art. Samples include, but are not limited to, IKE software licensed from Lucent® or SafeNet®.

If the first 110 and second 114 gateway computers already share an IKE SA, then the IPSec SA can be created fairly quickly. If not, then an IKE SA must first be established before an IPSec SA can be established. To establish an IKE SA, the first 110 and second 114 gateway computers exchange digital certificates, which have been digitally signed by a trusted third party certificate authority 115. Thereafter, when the IKE session becomes active, the first 110 and second 114 gateway computers can establish the IPSec SA.

In order to establish the IPSec SA, the first 110 and second 114 gateway computers must agree upon an encryption algorithm, an authentication algorithm, and have a shared session key. The first 110 and second 114 gateway computers must also provide each other with the appropriate SPI value 310, 410 to include in the IPSec header portion 304, 404. When this is done, the IPSec SA has been established, and the first 110 and second 114 gateway computers store the SA in respective Security Association Databases (SADs) 116, 118. As will be described in more detail below, the SADs 116, 118 reside in a memory storage device. The memory storage device may be incorporated into the gateway computers 110, 114 or, as depicted in FIG. 1, be physically separate therefrom. Thereafter, the first gateway computer 110 encrypts each IP datagram 200, forms a new IPSec datagram 300, 400, and sends it to the second gateway computer 114. When the second gateway computer 114 receives the IPSec datagram 300, 400, it looks up the IPSec SA in its SAD 118, properly processes the datagram, and forwards it to the second individual computer workstation 112-1.

Figure 5:
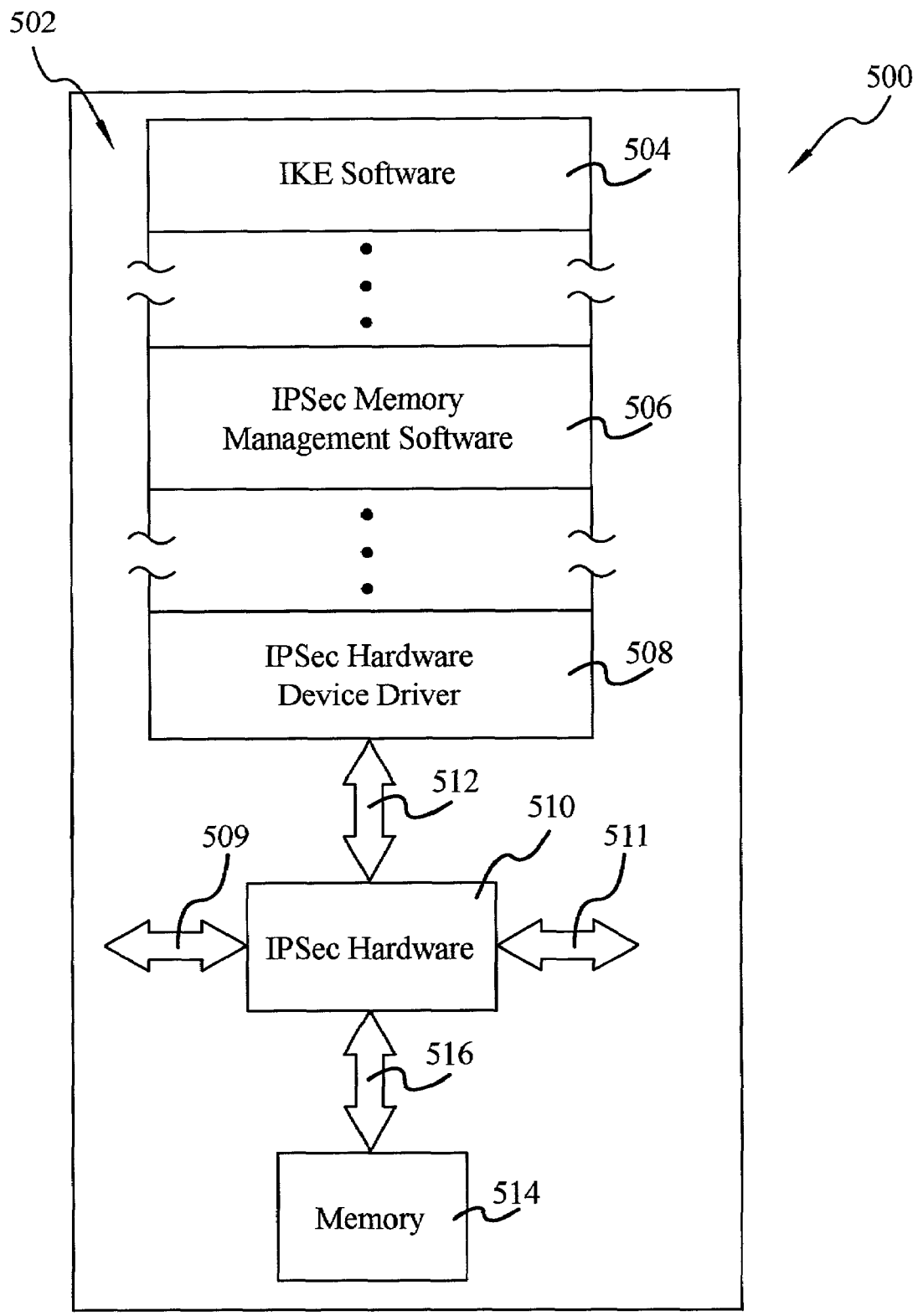
FIG. 5 is a simplified graphic and schematic representation of a software stack and IPSec hardware components according to an embodiment of the present invention.

Having generally described an IPSec datagram 300, 400, and how an IPSec SA is established and, once established, determined, a more detailed description of the present invention will now be provided. In doing so, reference should first be made to FIG. 5, which depicts a simplified graphic and schematic representation of a computer's processor software stack coupled to an IPSec hardware device and memory storage device. Again, the computer 500 may be a gateway or router, such as the first 110 or second 114 gateway computers, or a stand-alone computer, such as the individual computer workstations 108-1, 108-2, 108-3, . . . 108-N, 112-1, 112-2, 112-3, . . . 112-N. In any case, the computer's software stack 502 includes, at least, an IKE software component 504, an IPSec memory management software component 506, and an IPSec hardware device driver 508. The software stack 502 is coupled to an IPSec hardware device 510 via a first communication bus 512. The IPSec hardware device 510, which is coupled to receive IPSec datagrams via a first input/output (I/O) bus 509 and output processed IP data payloads via a second I/O bus 511, implements all of the necessary IPSec processing under the control of the various software components. The IPSec hardware device 510 may be a general purpose microprocessor device or, in a preferred embodiment, is an application specific hardware device (e.g., ASIC) designed specifically for IPSec implementation. A memory storage device 514 is coupled to the IPSec hardware component 510 via a second communication bus 516. The memory storage device 514 includes a plurality of memory regions that comprise the SAD of the computer 500. The memory storage device 514 is similar to, and functions the same as, the SADs 116, 118 described above with reference to FIG. 1. Hence, although FIG. 5 depicts the memory storage device 514 as being physically included as a part of the computer 500, this is only exemplary of a preferred embodiment. It is to be appreciated that the memory storage device 514 may be physically separate from the computer 500.

Figure 6:
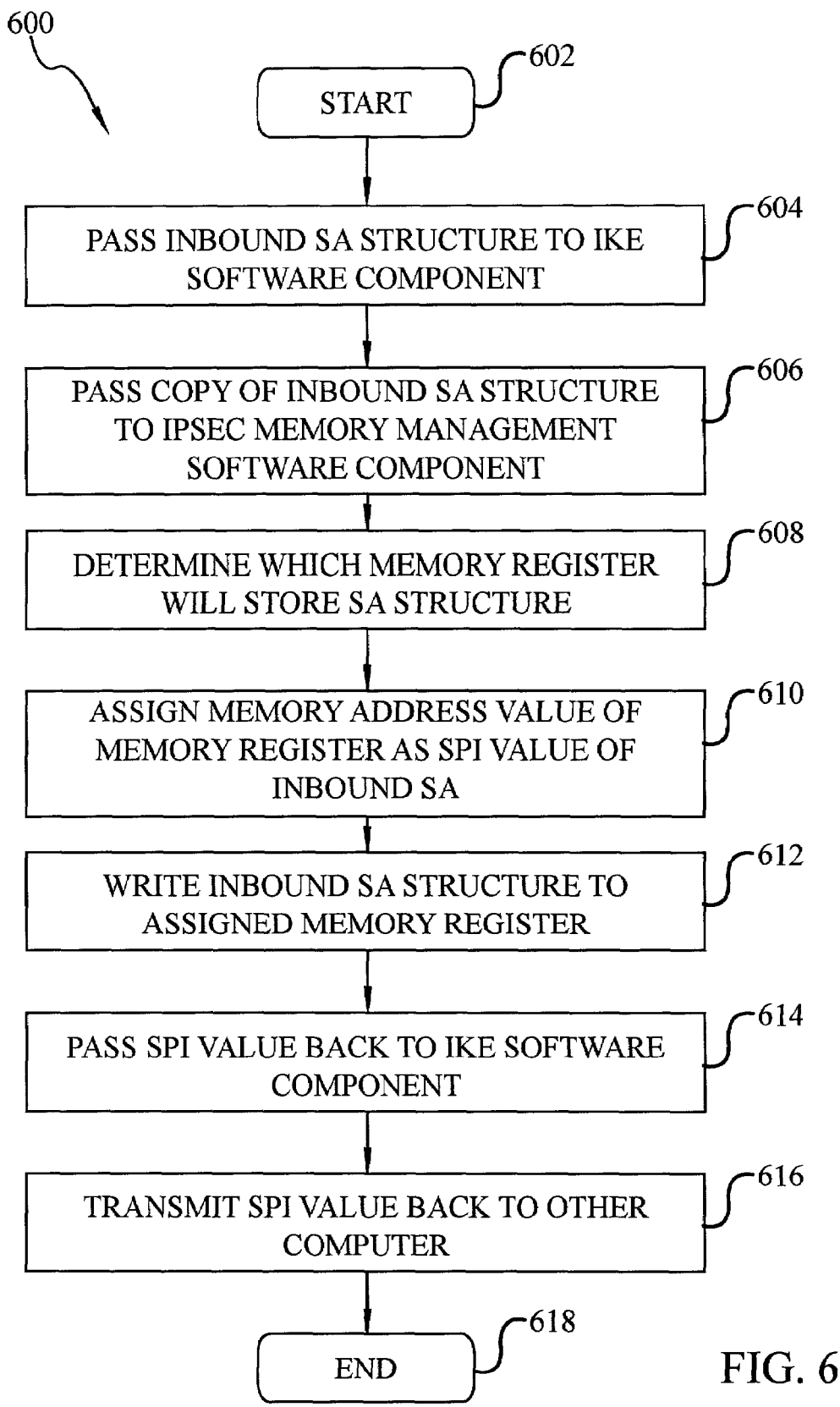
FIG. 6 depicts a process for assigning an Security Parameter Index value to an inbound Security Association according to an embodiment of the present invention.

Referring now to FIG. 6 in combination with FIG. 5, the process 600 for assigning an SPI value to an inbound SA will now be discussed. In this regard, the parenthetical references to "STEPs" correspond to the particular reference numerals of the process flowchart depicted in FIG. 6. The process 600 begins when the IPSec hardware component 510 receives an SA structure from an external non-secure network (e.g., the Internet) and determines that it needs to establish an inbound SA (STEP 602). If so, this inbound SA structure is passed to the IKE software component 504 (STEP 604). In response, the IKE software component 504 will request, preferably via an application programmable interface (API), a 32-bit SPI value 312, 412 from the IPSec memory management software component 506. To accomplish this, the IKE software component 504 passes the IPSec memory management software component 506 a copy of the received SA structure (STEP 606). The IPSec memory management software component 506 is responsible for partitioning the SAD in the memory storage device 514 and determining in which memory regions each of the SAs reside. Hence, the IPSec memory management software component 506, upon receipt of the SA structure from the IKE software component 504, determines which memory region in the memory storage device 514 will store the SA structure (STEP 608).

Each memory region in the memory storage device 514 is, as is generally known, indexed using a specific memory address value. In a preferred embodiment, each memory address value is 32-bits in length, which matches the standard bit length of an IPSec SPI value. Thus, the memory address value of the memory region that will store the SA structure is assigned as the SPI value 312, 412 of the inbound SA (STEP 610). The IPSec hardware device 510 then writes the inbound SA structure to the assigned memory region for storage (STEP 612), and the IPSec memory management software passes the SPI value 312, 412 to the IKE software component 504 (STEP 614), which maintains its own SA tables. As is generally known in the art, the SA table entries within the IKE software component 504 are used during IPSec SA "initial establishment" or "refresh" events. Hence, further discussion of these tables, which is not critical to an understanding or the enablement of the present invention, will not be provided. The computer 500, via the IKE software component 504, then transmits the assigned SPI value back to the computer that requested that the SA be established (STEP 616). The process then ends (STEP 618).

Figure 7:
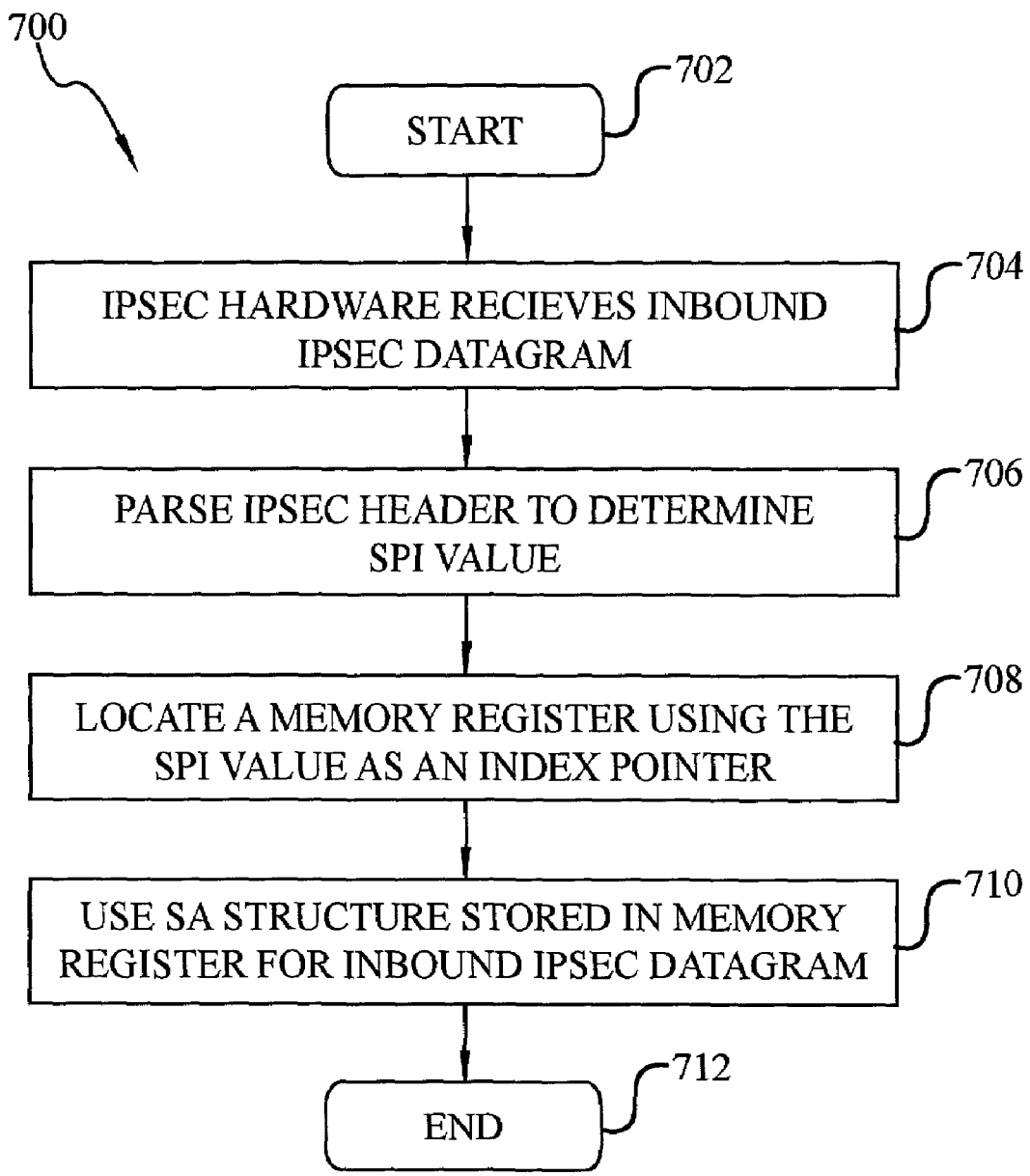
FIG. 7 depicts a process for determining and locating an appropriate inbound Security Association for an inbound IPSec datagram according to an embodiment of the present invention.

Once the SPI value is assigned and the SA is established, the IPSec hardware device 510 is able to process inbound IPSec datagrams 300, 400. The skilled artisan will appreciate that this processing is generally the same, whether operating in tunnel mode or transport mode. Turning now to FIG. 7, the process 700 that is carried out by the IPSec hardware device 510 to determine and locate the appropriate SA for the inbound IPSec datagrams will be described. The process begins (STEP 702) when the IPSec hardware device 510 receives an inbound IPSec datagram 300, 400 via the first I/O bus 509 (STEP 704). Upon receipt of the IPSec datagram 300, 400, the IPSec hardware device 510 parses the IPSec header 304, 404 to locate the SPI value 312, 412 (STEP 706). This SPI value is then used to locate the memory region in the SAD that has the same address value as the SPI value (STEP 708). The SA structure that is stored in that memory region is then used as the SA for the inbound IPSec datagram (STEP 710). The process then ends (STEP 712).

The present invention eliminates the need for elaborate and time consuming SAD table lookup algorithms, which result in costly memory access times and complex lookup hardware. The present invention allows high-speed and efficient inbound SA lookup without significantly impacting memory access bandwidth.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method of establishing a secure communication channel for information flow between two or more computers communicating via an interconnected computer network, comprising:

receiving a security association data structure from one or more computers via the interconnected computer network;

storing the received security association data structure in a memory region having a specific memory address value associated therewith; and assigning the specific memory address value as a security parameter index value associated with the received security association data structure.

2. The method of claim 1, further comprising:

transmitting the security parameter index value to the one or more computers from which the security association data structure was received.

3. The method of claim 1, wherein the specific memory address value and the security parameter index value, are both 32 bit values.

4. The meted of claim 1, wherein the received security association data structure is stored in a security association database that includes other security association data structures.

5. The method of claim 1, wherein the received security association data structure comprises a network destination address value and a security protocol identifier.

6. A computer-readable medium containing computer executable code for instructing a computer to establish a secure communication channel for information flow between one or more other computers communicating via an interconnected computer network, the instructions comprising:

receiving a security association data structure from one or more computers via the interconnected computer network;

storing the received security association data structure in a memory region having a specific memory address value associated therewith; and assigning the specific memory address value as a security parameter index value associated with the received security association data structure.

* * * * *